(No Model.)
S. C. MEDDICK.
FERTILIZER DISTRIBUTING ATTACHMENT FOR ROLLERS.
No. 297,828. Patented Apr. 29, 1884.
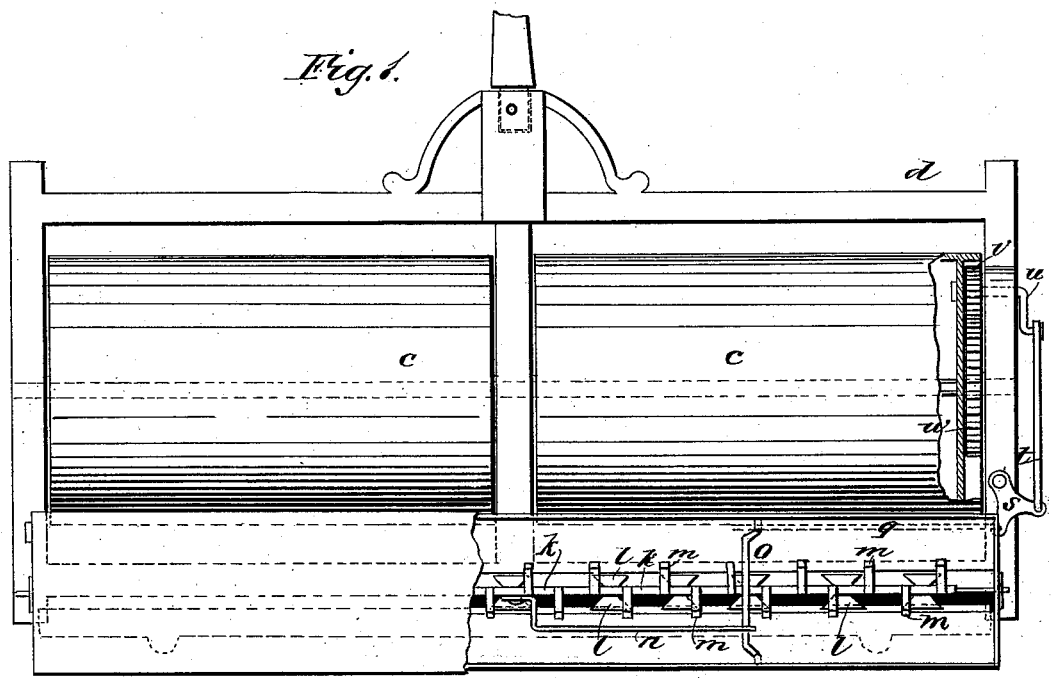
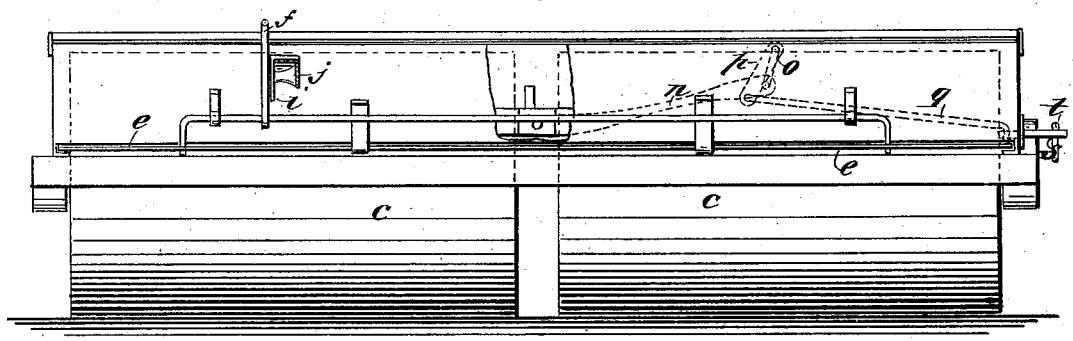
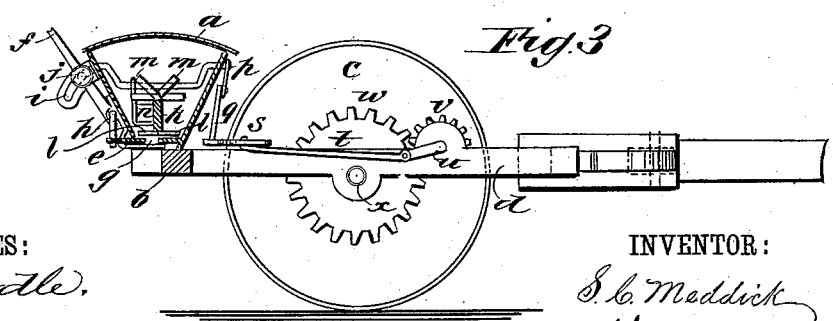
WITNESSES:
INVENTOR:
S. C. Meddick
BY Munn & Co.
ATTORNEYS.

UNITED STATES PATENT OFFICE.

SANFORD C. MEDDICK, OF OVID, NEW YORK.

FERTILIZER-DISTRIBUTING ATTACHMENT FOR ROLLERS.

SPECIFICATION forming part of Letters Patent No. 297,828, dated April 29, 1884.

Application filed January 17, 1884. (No model.)

*To all whom it may concern:*

Be it known that I, SANFORD C. MEDDICK, of Ovid, in the county of Seneca and State of New York, have invented a new and Improved Fertilizer-Distributing Attachment for Rollers, of which the following is a full, clear, and exact description.

My invention consists of an improved contrivance of apparatus for effecting uniform distribution of fertilizers in a distributing attachment to land-rollers, as hereinafter fully described.

Reference is to be had to the accompanying drawings, forming part of this specification, in which similar letters of reference indicate corresponding parts in all the figures.

Figure 1 is a plan view of a roller having a fertilizer-distributing attachment of my improved contrivance, the cover of the fertilizer-hopper being partly removed. Fig. 2 is a rear elevation of the same; and Fig. 3 is a transverse section through the hopper, and side elevation of the rest of the machine.

I mount a long fertilizer-holding hopper, $a$, on the rear extension, $b$, of the frame of a land-roller of any approved form—as a pair of rolls, $c$, arranged end to end in a frame, $d$—and I make the rear half, $e$, of the bottom of said hopper to slide forward and backward by a lever, $f$, for regulating the size of a long narrow slit-opening, $g$, extending from end to end of the bottom, for distributing the fertilizer on the ground, said lever being fixed on a fulcrum-pivot at $h$, and ranging along a curved slotted bar, $i$, to which it is to be fastened to set the slide-bottom $e$ at any desired point by the binding-screw $j$.

For preventing the clogging of the slit $g$ and for agitating the fertilizer in the hopper, so as to insure the settling of it down to the slit, I arrange a long narrow plate, $k$, edgewise in the hopper, with thin flat plates $l$ attached to the lower edge and projecting each way over and resting on the bottom of the hopper, and with laterally-inclined prongs $m$ projecting from the upper edge. The plates $l$ have pointed ends, forming edges of the plates, inclined from the sides of the hopper to the center, for gathering the fertilizer to the feeding-slit $g$, and said plates slide along the bottom of the hopper forward and backward by the reciprocation of the plate $k$, so as to thoroughly dislodge any of the matters clogging on or over the slit. Some of the prongs $m$ may be bent down to a horizontal position, if desired, for the better agitating of the contents of the hopper above the bottom.

The plate $k$ is connected by a rod, $n$, with a cranked rocker, $o$, arranged transversely to the hopper, and connected by an arm, $p$, outside of the hopper with another connecting-rod, $q$, which is connected to the bell-crank $s$, and the bell-crank is connected by rod $t$ with a crank, $u$, which is geared by the pinion $v$ and wheel $w$ with the axle $x$ of one of the rollers $c$.

It will be seen that the reciprocating bar $k$, with its plates $l$ and prongs $m$, will effectually agitate and distribute the contents of the hopper through the discharge-orifice $g$ on the bottom of the hopper, and that the means for operating the same are very simple to construct and keep in repair.

Having thus described my invention, what I claim as new, and desire to secure by Letters Patent, is—

1. The reciprocating bar $k$, having plates $l$ on the lower edge, and the prongs $m$ on the upper edge, and being arranged in the hopper over slot $g$ of the bottom of said hopper, and geared with one of the roller-shafts by mechanism, substantially as described, for operating it.

2. The reciprocating bar $k$, having plates $l$, both of the side edges of each plate inclining inwardly to the slot $g$ of the hopper, in combination with the means for reciprocating said bar, substantially as shown and described.

SANFORD C. MEDDICK.

Witnesses:
I. D. THOMAS,
A. B. HAUSE.